United States Patent
Nishimura

(10) Patent No.: US 6,778,217 B1
(45) Date of Patent: Aug. 17, 2004

(54) IMAGE-CAPTURING DEVICE HAVING AN ELECTRONIC VIEWFINDER AND EXTERNAL MONITOR WITH SHARED CONTROL

(75) Inventor: Yoshihiko Nishimura, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/457,375

(22) Filed: Dec. 9, 1999

(30) Foreign Application Priority Data

Dec. 14, 1998 (JP) .......................... P10-354357

(51) Int. Cl.⁷ .......................... H04N 5/222; G09G 5/08; G09G 5/00
(52) U.S. Cl. .......................... 348/333.12; 348/333.01; 348/333.02; 348/333.11; 345/160; 345/173; 345/174; 345/179
(58) Field of Search .................. 348/333.01, 333.02, 348/333.11, 333.12, 115, 207.99, 373, 374, 375, 376, 341; 396/373; 345/158, 159, 160, 173, 174, 179

(56) References Cited

U.S. PATENT DOCUMENTS

| | | | | |
|---|---|---|---|---|
| 5,729,289 A | * | 3/1998 | Etoh ..................... | 348/333.02 |
| 5,808,678 A | * | 9/1998 | Sakaegi ................. | 348/333.03 |
| 5,864,481 A | * | 1/1999 | Gross et al. .............. | 700/90 |
| 6,091,450 A | * | 7/2000 | Hirasawa ................ | 348/333.01 |
| 6,243,080 B1 | * | 6/2001 | Molne .................... | 345/173 |
| 6,278,443 B1 | * | 8/2001 | Amro et al. ............... | 345/173 |
| 6,424,843 B1 | * | 7/2002 | Reitmaa et al. ............ | 455/566 |
| 6,518,956 B1 | * | 2/2003 | Sato ..................... | 345/173 |
| 6,538,663 B2 | * | 3/2003 | Kamei .................... | 345/635 |
| 6,556,240 B2 | * | 4/2003 | Oka et al. ............... | 348/211.99 |
| 2001/0038420 A1 | * | 11/2001 | Toyoizumi et al. ......... | 348/373 |
| 2002/0008763 A1 | * | 1/2002 | Kawamura et al. ......... | 348/232 |
| 2002/0058240 A1 | * | 5/2002 | Redford et al. ........... | 434/307 R |
| 2002/0105588 A1 | * | 8/2002 | Nishimura ............... | 348/333.12 |

FOREIGN PATENT DOCUMENTS

| | | |
|---|---|---|
| EP | 0 689 350 A2 | 12/1995 |
| EP | 0 700 203 A1 | 3/1996 |
| JP | 06-148714 | 5/1994 |

* cited by examiner

Primary Examiner—Andrew Christensen
Assistant Examiner—Brian Genco
(74) Attorney, Agent, or Firm—Rader, Fishman & Grauer PLLC; Ronald P. Kananen

(57) ABSTRACT

An image-capturing device includes an external monitor which has a touch panel mounted on an image display screen having a backlight, and which has an openable/closeable and rotatable mechanism; an electronic viewfinder which is smaller than the external monitor and which has an eyepiece section; and a display device for displaying a pointer which moves within the screen of the electronic viewfinder in accordance with an operation of the touch panel and for displaying an operation area for inputting an instruction of various operations which are associated with taking a photograph by specifying and selecting the operation area by the pointer. When an image is recorded or replayed by using the electronic viewfinder, the pointer is moved by operating the touch panel in order to select a desired operation area, thereby inputting an instruction of various operations.

5 Claims, 5 Drawing Sheets

IMAGE-CAPTURING DEVICE HAVING AN ELECTRONIC VIEWFINDER AND EXTERNAL MONITOR WITH SHARED CONTROL

BACKGROUND OF THE INVENTION

1. Field of the Invention

The present invention relates to an image-capturing device having two image display systems, which are an electronic viewfinder and an external monitor. The image-capturing device simplifies various operations which are associated with the taking of photographs when a photograph is taken using the electronic viewfinder.

2. Description of the Related Art

In image-capturing devices, such as video cameras or still cameras having both an electronic viewfinder (hereinafter abbreviated as an "EVF") and an external monitor, an image-capturing device is known in which transparent switches (commonly called a touch panel), through which it is possible to see an image displayed therebelow, are mounted on the image display screen of an external monitor. Since the touch panel is well known, a description of the operating principles, and so forth, is omitted.

In such an image-capturing device using a touch panel as an operation system, an operation area (or e.g., an operation switch) displayed as a two-dimensional image on an image display surface is directly touched by a finger, and so forth, in order to perform, for example, focus adjustment, brightness adjustment, and so forth, on a photographic image while taking a photograph.

However, in an image-capturing device using a touch panel, such as that described above, there is a problem in that the operation when taking a photograph while viewing the external monitor screen is completely different from the operation when taking a photograph while viewing through the EVF.

When taking a photograph while viewing the external monitor screen, a photographer may perform various adjustments by touching, by a finger, etc., the touch panel on the image of the operation switch that is displayed on the screen at the same time as the photographic image. However, when a photograph is taken while viewing through the EVF, it is impossible to view the EVF and the external monitor screen simultaneously. Therefore, even if an operation switch similar to that displayed on the external monitor screen is displayed on the EVF, it is impossible to perform an operation by touching a specific portion of the touch panel corresponding to the operation switch.

Therefore, when taking a photograph while viewing through the EVF, an operation must be performed by using a dedicated operation switch, etc., which is mounted separately, requiring a user to perform an operation different from that when taking a photograph while viewing the external monitor screen. This leads to an increased cost for the image-capturing device and a more comlex and troublesome user operation.

SUMMARY OF THE INVENTION

In view of the above-described problems, it is an object of the present invention to provide various common operation procedures when an EVF is used and when an external monitor is used in an image-capturing device having two image display systems, which are an EVF and an external monitor, and which uses a touch poanel for various operation switches while taking a photograph, etc.

To achieve the above-mentioned object, according to the present invention, there is provided an image-capturing device which comprises an external monitor which has a touch panel mounted on an image display screen, the image display screen having a backlight, and which has an openable/closeable and rotatable mechanism; an electronic viewfinder which is smaller than the external monitor and which has an eyepiece section; and a display unit for displaying a pointer which moves within the screen of the electronic viewfinder in accordance with an operation of the touch panel and displays an operation area for inputting an instruction of various operations which are associated with taking a photograph by specifying and selecting the operation area by the pointer. When an image is recorded or replayed by using the electronic viewfinder, the pointer is moved by operating the touch panel in order to select a desired operation area, thereby inputting an instruction of various operations.

Therefore, it is possible to provide substantially common methods of various operations when an image is recorded or replayed by using an EVF and when an image is recorded or replayed by using an external monitor.

In the accompanying drawings, there are shown an illustrative embodiment of the invention from which these and other of its objectives, novel features, and advantages will be readily apparent.

FIG.. 8 shows the screen of the EVF when the pointer is moved by operating the touch panel when taking a photograph by using the EVF.

Figure 9:
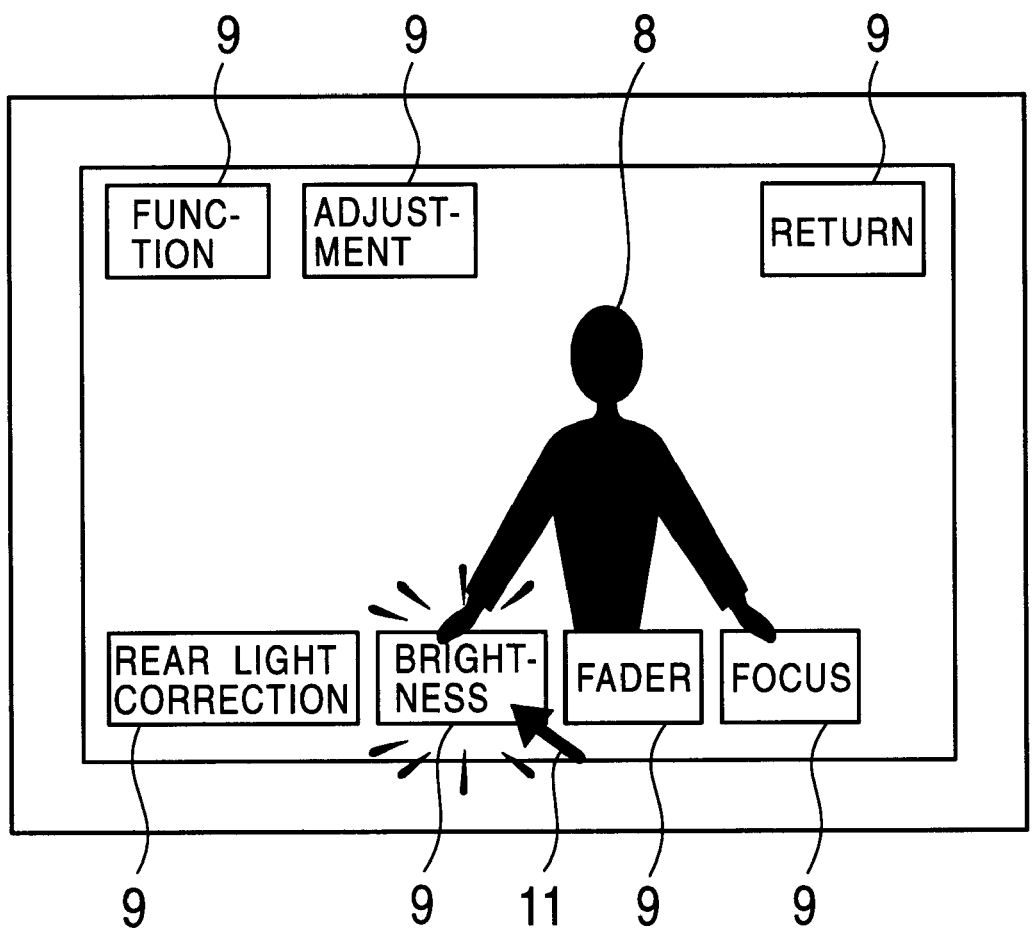

FIG. 9 shows the screen of the EVF when an operation button is selected by the pointer by operating the touch panel when taking a photograph by using the EVF.

DESCRIPTION OF THE PREFERRED EMBODIMENT

The preferred embodiment of the present invention will be described below with reference to the accompanying drawings.

Figure 1:
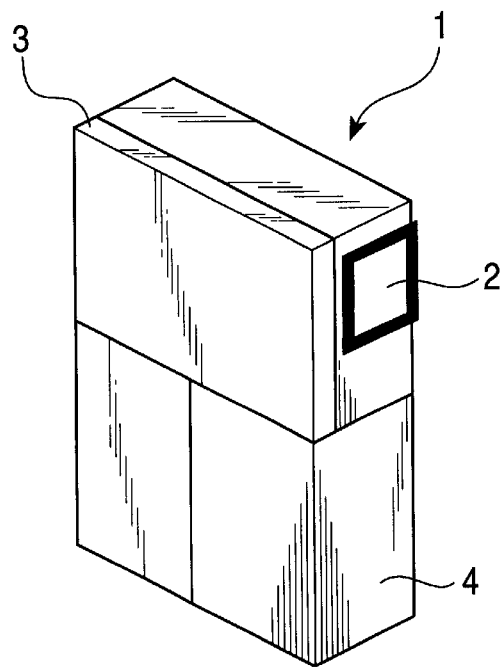
FIG. 1 is a perspective view showing the entire image-capturing device in a state in which an external monitor is closed.
Figure 2:
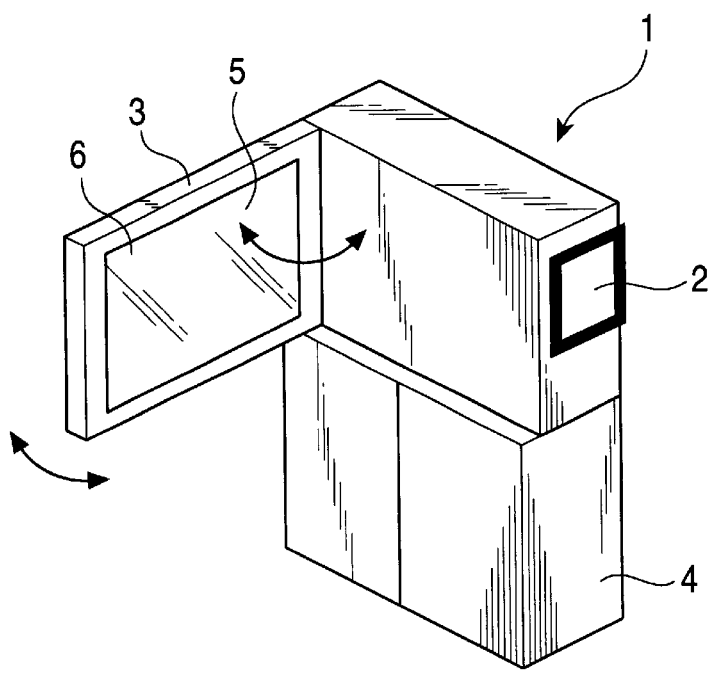
FIG. 2 is a perspective view showing the entire image-capturing device in a state in which the external monitor is opened.

As shown in FIGS. 1 and 2, an image-capturing device 1 is a video camera having an electronic viewfinder (EVF) 2 and an external monitor 3 as image display systems for displaying an image of an object or a replayed image when taking a photograph or replaying the image.

Both the EVF 2 and the external monitor 3, which differ in size, use a liquid-crystal device (LCD), and so forth, as a display device.

Figure 4:
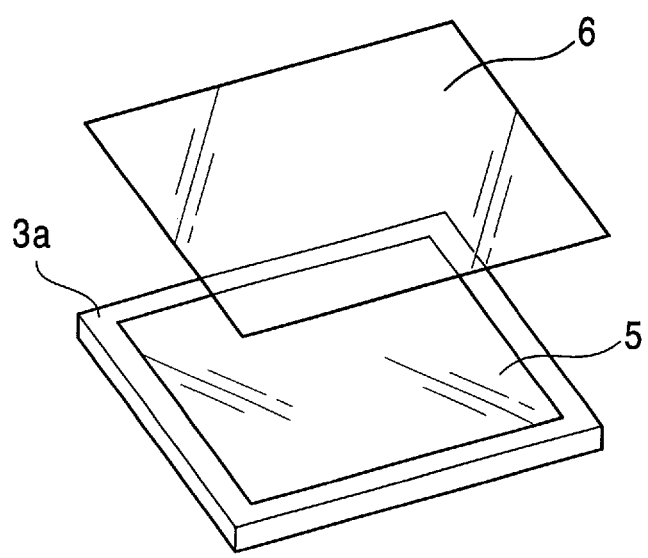
FIG. 4 is a perspective view showing an LCD panel and a touch panel of the external monitor.

As shown by the arrow in FIG. 2, the external monitor 3 is supported on a main unit 4 in such a manner as to be openable/closeable and rotatable with respect to the main unit 4. As shown in FIG. 4, a touch panel 6 for use with, for example, an electrostatic-capacitance detection method, which is transparent so that an image displayed on an image display screen 5 can be seen, is pasted onto the external monitor 3, that is, the image display screen 5 of an LCD panel 3a.

In the video camera 1, taking a photograph using the external monitor 3 is performed when the external monitor 3 is opened with respect to the main unit 4, as shown in FIG. 2, and while viewing an image 8 (see FIG. 7) of the object displayed on the external monitor 3.

Figure 7:
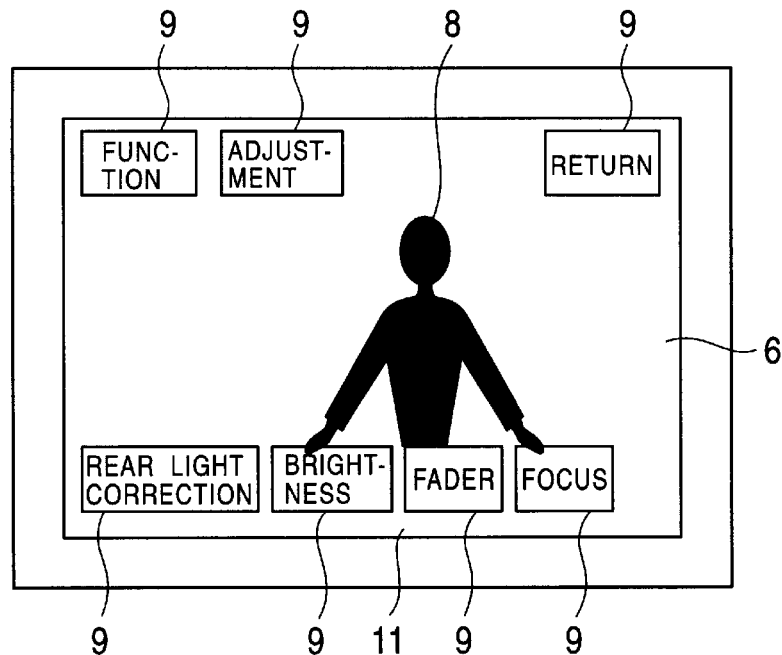
FIG. 7 shows the screen of the external monitor when taking a photograph by the external monitor.

At this time, various operations which are associated with taking a photograph are performed by the user directly touching, with a finger, various operation buttons 9, 9, . . . displayed as images in such a manner as to be superposed on the image 8 of the object displayed on the screen 5 of the external monitor 3, for example, as shown in FIG. 7.

More specifically, as described above, the touch panel 6 for sensing in a two-dimensional manner the position at which the finger, etc., of the user touches is pasted on the image display screen 5 of the external monitor 3. Therefore, when the user touches an appropriate operation button 9, the position thereof is sensed by the touch panel 6, and this information is sent to a system control section of the video camera 1, whereby a corresponding process is performed.

As described above, in the image-capturing device 1, when taking a photograph by using the external monitor 3, the various operation buttons 9, 9, . . . displayed together with the image of the object on the screen 5 of the external monitor 3 can be operated as if they were actual operation buttons while viewing the state of the image 8 of the object on which the operation is to be performed. Therefore, the video camera 1 has the feature that user interfacing can be performed more interactively than a conventional operation system.

The external monitor 3 has the drawback that if external light is too bright, such as while taking a photograph outdoors, the image displayed on the screen 5 becomes difficult to see and the lifetime of the battery is shortened because the power consumption of a backlight used in the LCD, etc., is large. In order to avoid these drawbacks, taking a photograph also is performed by using the EVF 2.

Figure 3:
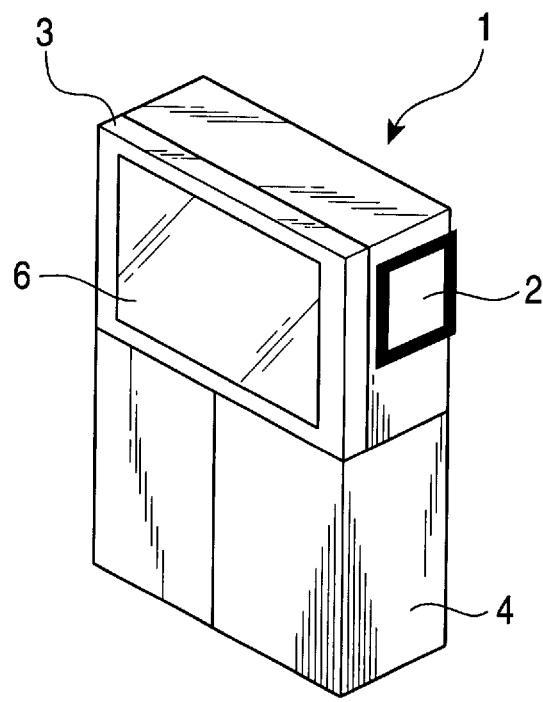
FIG. 3 shows the entire image-capturing device in a state in which the external monitor is closed with the image display screen facing outward.
Figure 5:
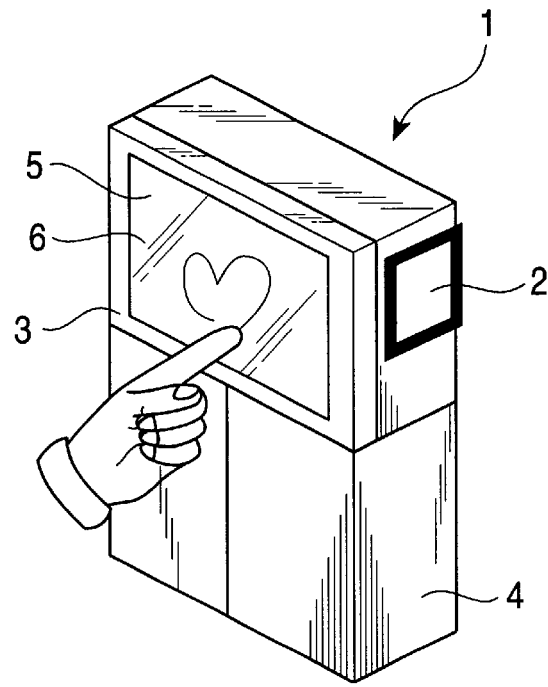
FIG. 5 shows a method of moving a pointer by operating the touch panel when taking a photograph by using an EVF.

Taking a photograph using the EVF 2 in the image-capturing device 1 is performed when the external monitor 3 is housed in the main unit 4 with the image display screen 5 facing outward, as shown in FIGS. 3 and 5.

Figure 8:
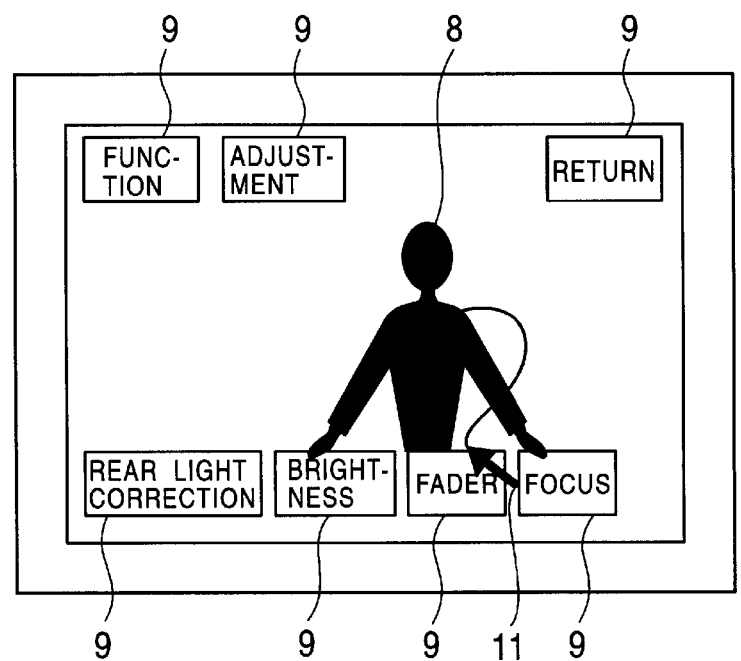

As shown in FIGS. 8 and 9, the image 8 of the object, various operation buttons 9, 9, . . . , and a cursor (pointer) 11 in the shape of an arrow are displayed on a screen within the EVF 2 in a manner similar to that for the external monitor 3.

The cursor 11 is capable of performing a movement and an operation of selecting the various operation buttons 9, 9, . . . by operating the touch panel 6 pasted on the image display screen 5 of the external monitor 3 asa pointing device in what is commonly called a GUI (Graphical User Interface), like a trake-pad used in a notebook-type personal computer.

More specifically, as shown in FIGS. 5 and 8, when the finger is moved in any desired direction while touching the touch panel 6, the cursor 11 is moved within the screen in a manner similar to the movement traced by the finger on the touch panel 6.

Figure 6:
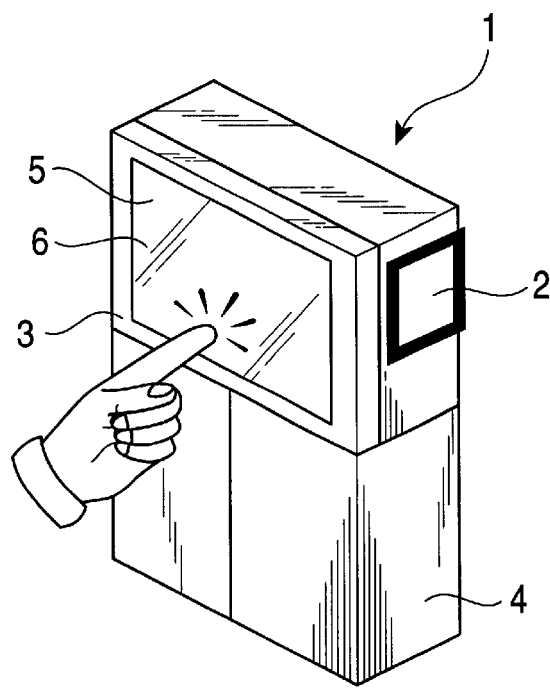
FIG. 6 shows a method of selecting an operation button by the pointer by operating the touch panel when taking a photograph by using the EVF.

Also, in the operation of selecting the operation buttons 9, 9, . . . , as shown in FIGS. 6 and 9, by moving the cursor 11 onto a desired operation button 9 and by tapping (hitting the touch panel 6 and releasing) a finger on the touch panel 6 at that position, this information sent is to the system control section of the video camera 1, as if an actual switch was pressed, and a corresponding process is performed.

At this time, there is no need either to display the image 8 of the object and the various operation buttons 9, 9, . . . on the screen 7 of the external monitor 3 or to switch on the backlight. Therefore, in the video camera 1, in order to reduce power consumption and to increase th battery-driven operating time when taking a photograph or replaying by the EVF 2, a power saving mode for cutting the power supply to the backlight, which has a high power consumption, is set. As a result of cutting all the signals and power supply to the external monitor 3 (LCD), more power is saved, thereby obtaining a desirable power saving mode.

As described above, in the video camera 1, when taking a photograph by the EVF 2 when the external monitor 3 is closed, the cursor 11 is displayed on the screen of the EVF 2, and this cursor 11 is operated by using the touch panel 6 pasted onto the image display screen 5 of the external monitor 3, making it possible to realize nearly the same ease of operation as that when taking a photograph with a combination of the external monitor 3 and the touch panel 6. Therefore, in an image-capturing device having an EVF and an external monitor, such as a video camera, when the EVF is used, the problem of the ease of operation being reduced when a touch panel is used for an operation can be solved. Moreover, the addition of another operation device used only when the EVF is used is unnecessary. Thus, it is possible to realize a similar ease of operation when the EVF is used and when the external monitor is used.

Although in the above-described embodiment an example is described in which the present invention is applied to a video camera, it is possible to apply the present invention to an electronic still camera having an EVF and an external monitor.

Furthermore, the specific shape and construction of each section shown in the above-described embodiment are only examples exemplifying the present invention, and the technological scope of the present invention should not limited by these examples.

As is clear from the foregoing, the image-capturing device of the present invention is an image-capturing device having an electronic viewfinder and an external monitor as two image display systems. A touch panel is mounted on the image display screen of the external monitor. A pionter which moves within the screen in accordance with an operation of the touch panel and an operation area for inputting an instruction of various operations which area associated with taking a photograph by specifying and selecting the operation area by the pointer are displayed on the electronic viewfinder. Furthermore, when an image is recorded or replayed by using the electronic viewfinder, the pointer is moved by operating the touch panel in order to select a desired operation area, thereby inputting an instruction of various operations. This makes it possible to provide substantially common methods of various operations when an image is recorded or replayed by using an external monitor. As a result, it is possible to prevent an increased cost for the device as a result of providing a dedicated operation system when the electronic viewfinder is used, and because the user does not need to memorize the operations of two systems, operations can be simplified.

Also, in the image-capturing device of the present invention, when an image is recorded or replayed by using the electronic viewfinder, the external monitor is placed in a power saving mode. Thus, it is possible to extend the operating time when driven by a battery.

Many different embodiments of the present invention may be constructed without departing from the spirit and scope of the present invention. It should be understood that the present invention is not limitd to the specific embodiment described in this specification. To the contrary, the present invention is intended to cover various modifications and equivalent arrangements included within the spirit and scope of he invention as hereinafter claimed. The scope of the following claims is to be accorded the broadest interpretation so as to encompass all such modifications, equivalent structures and functions.

What is claimed is:

1. An image-capturing device comprising:

an external monitor having a touch panel and an image display screen, wherein said touch panel is mounted on said image display screen and said image display screen has a backlight and an openable/closeable and rotatable mechanism;

an electronic viewfinder that is smaller in size than said external monitor and includes an eyepiece section; and display means for displaying a pointer on a screen of said electronic viewfinder, moving said pointer in accordance with an operation of said touch panel, and displaying on the screen of said electronic view finder an operation area for inputting one of a plurality of operation instructions associated with taking a photograph by specifying and selecting the operation area by the pointer, wherein when an image is recorded or replayed while watching said electronic viewfinder, the pointer is moved by operating the touch panel in order to select a desired operation area, thereby inputting one of a plurality of operation instructions, wherein said electronic viewfinder and said external monitor have common methods of operation associated with recording and replaying an image.

2. An image-capturing device according to claim 1, wherein, when an operation of inputting an instruction-of various operations is performed by using said electronic viewfinder, the image display screen of said external monitor is housed in a main unit of the device with the image display screen of said external monitor facing the outside of the device main unit, and the pointer is moved by moving a finger on the touch panel.

3. An image-capturing device according to claim 1, wherein, when an operation of inputting an instruction of various operations is performed by using said electronic viewfinder, an instruction of various operations is input by tapping a finger in an area displayed on the touch panel of the external monitor.

4. An image-capturing device according to claim 1, wherein, when an image is recorded or replayed by using said electronic viewfinder, said external monitor is placed in a power saving mode.

5. An image-capturing device according to claim 1, wherein said common methods of operation include operation buttons that are common to both of the screens of said electronic viewfinder and said external monitor.

* * * * *

UNITED STATES PATENT AND TRADEMARK OFFICE
CERTIFICATE OF CORRECTION

PATENT NO. : 6,778,217 B1
DATED : August 17, 2004
INVENTOR(S) : Yoshihiko Nishimura It is certified that error appears in the above-identified patent and that said Letters Patent is hereby corrected as shown below:

Column 5,
Line 29, "view finder" should read -- viewfinder --.

Column 6,
Line 10, "instruction-of" should read -- instruction of --.

Signed and Sealed this

Twenty-eighth Day of December, 2004

JON W. DUDAS
*Director of the United States Patent and Trademark Office*